C. L. AND L. F. RAGOT.
ROTARY ENGINE.
APPLICATION FILED JULY 8, 1919.

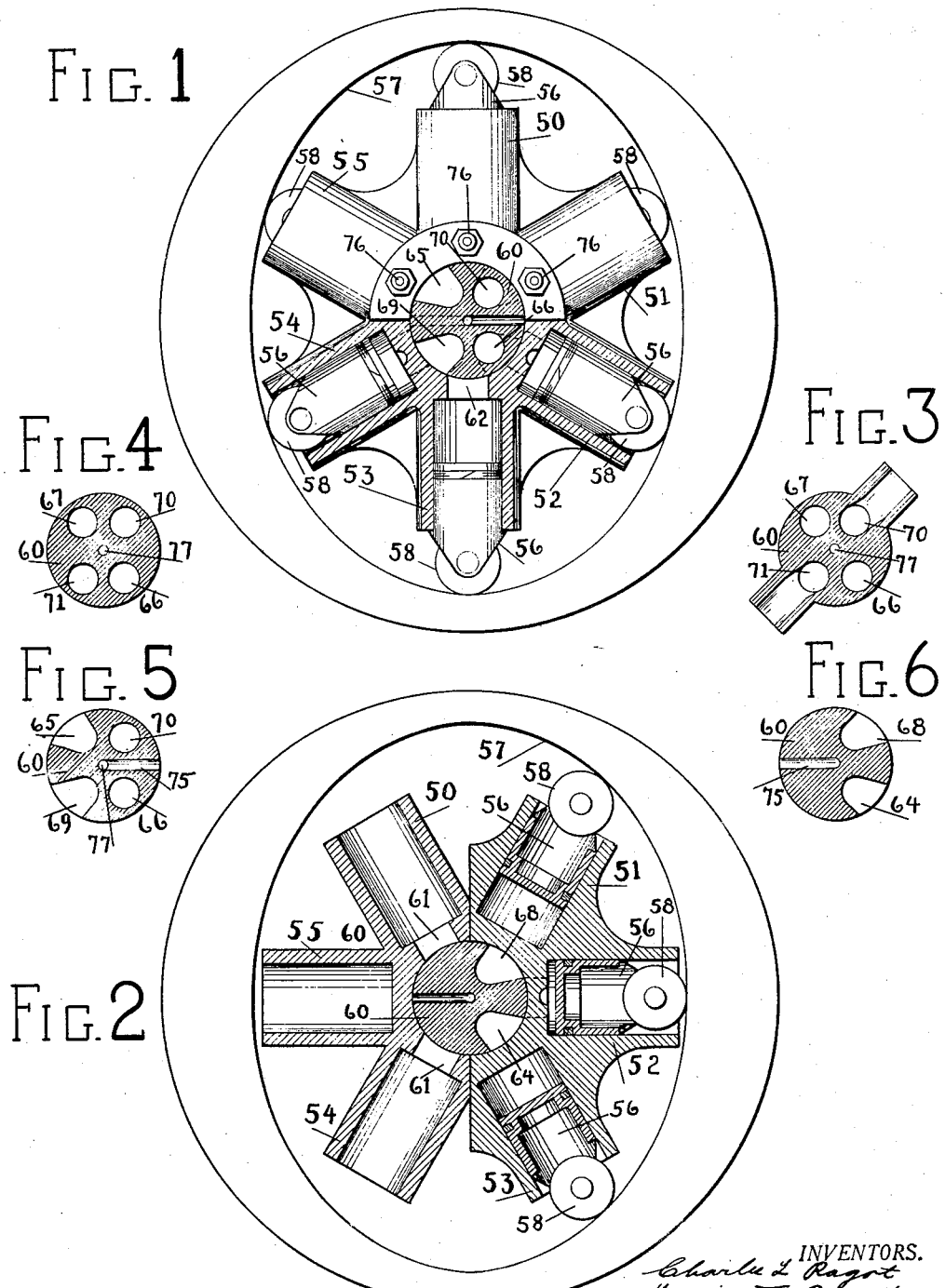

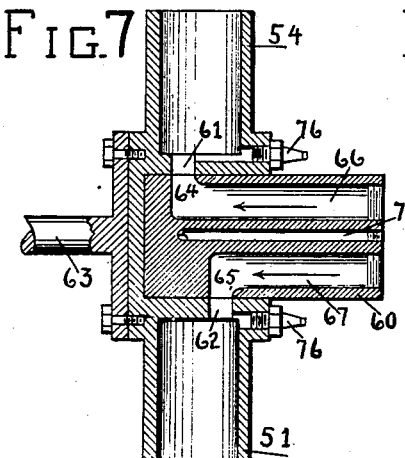
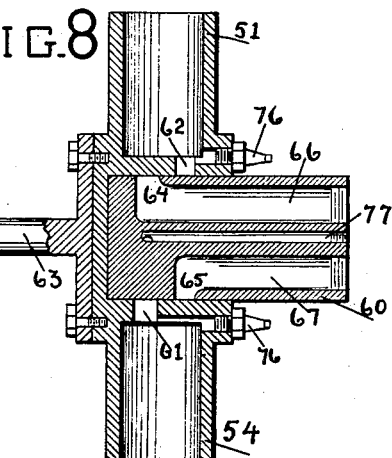
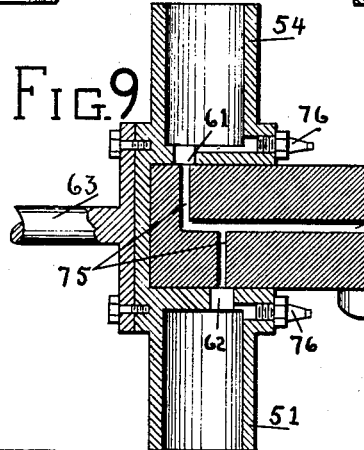
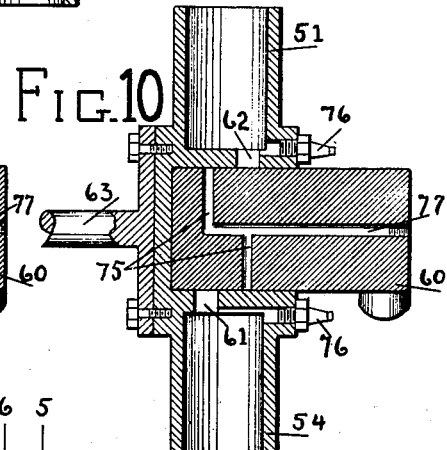
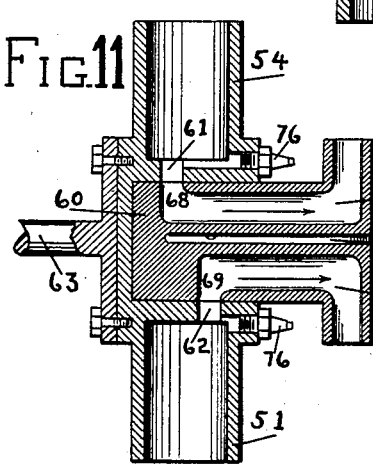
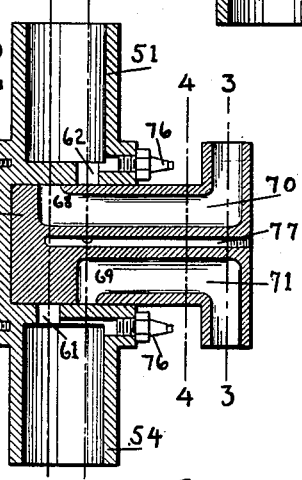

1,324,408.

Patented Dec. 9, 1919.
5 SHEETS—SHEET 4.

INVENTORS.
Charles L. Ragot
Louis F. Ragot
BY
C. W. Fairbank
ATTORNEY.

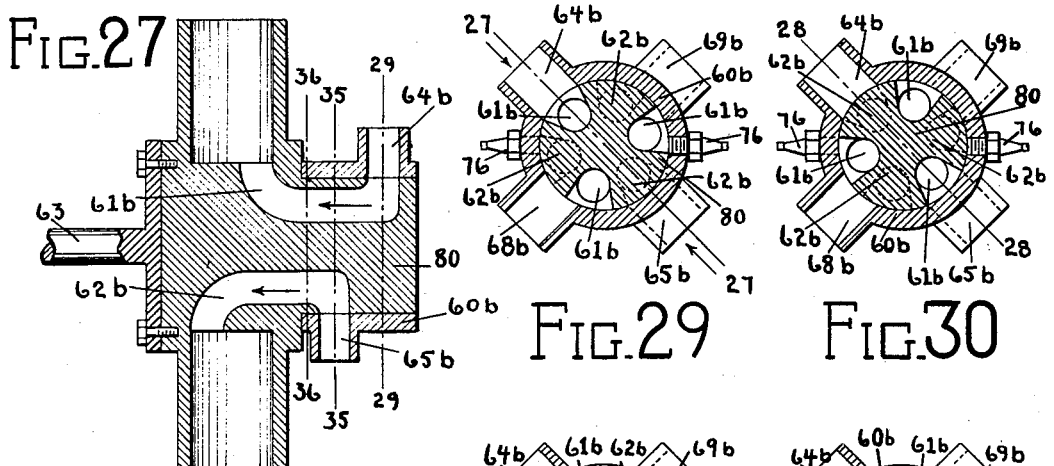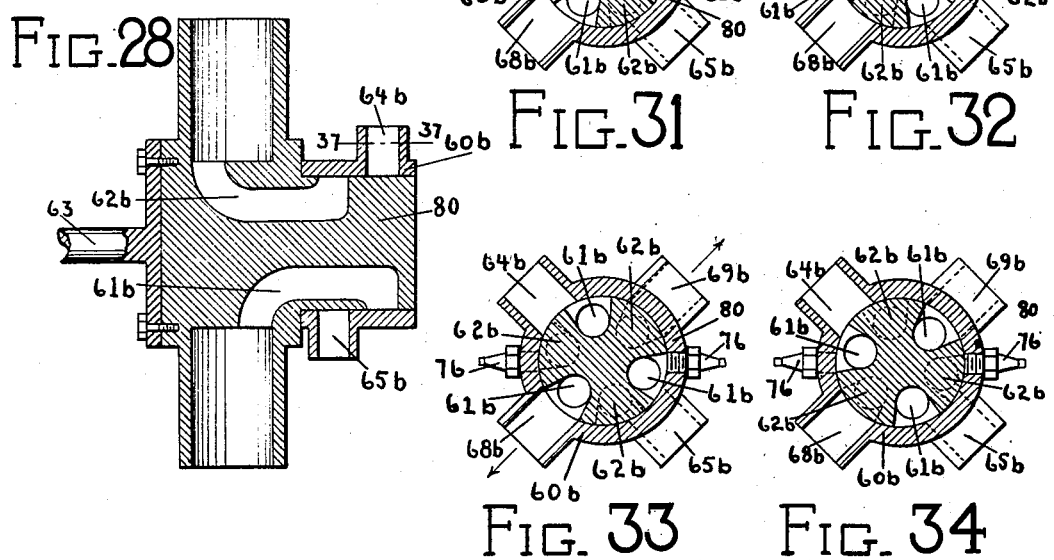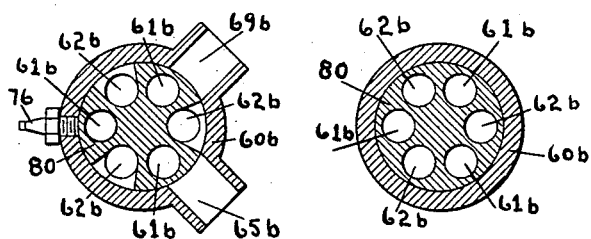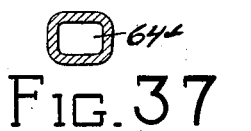

UNITED STATES PATENT OFFICE.

CHARLES L. RAGOT, OF NEW YORK, N. Y., AND LOUIS F. RAGOT, OF MILFORD, PENNSYLVANIA.

ROTARY ENGINE.

1,324,408.     Specification of Letters Patent.     Patented Dec. 9, 1919.

Application filed July 8, 1919. Serial No. 309,351.

*To all whom it may concern:*

Be it known that we, CHARLES L. RAGOT, a citizen of the United States, and a resident of Kingsbridge, New York city, in the county of New York and State of New York, and LOUIS F. RAGOT, also a citizen of the United States, and a resident of Milford, in the county of Pike and State of Pennsylvania, have invented certain new and useful Improvements in Rotary Engines, of which the following is a specification.

Our invention relates to improvements in rotary engines of that type in which a plurality of radially disposed cylinders rotate in respect to a stationary motive fluid distributer, the piston having operative engagement with a stationary guide encircling the axis of rotation of said cylinders for effecting the reciprocation of said pistons. The guide is of such shape, preferably elliptical, that four strokes of each piston are obtained in each revolution, whereby in the case of a four-stroke cycle internal combustion engine the complete cycle of operation takes place in each cylinder in one revolution. Engines of this general type are disclosed in our prior Patents 1,088,623 and 1,302,709 issued February 24, 1914 and May 6, 1919, respectively.

The main object of our invention is to balance the pressures against the elliptical guide and neutralize the pressure on the distributer shell by providing means whereby the successive steps in the cycle of operation take place simultaneously in each cylinder of a diametrically opposed pair. In order to accomplish this object, we provide a rotor comprising an odd number of pairs of opposed cylinders, and provide a motive fluid distributer with one set of ports for one cylinder of each diametrically opposed pair and a separate set of ports for the other cylinders. These ports are preferably separated into two annular series, each alternate port being in one of the series and the remaining ports being in the other series. The cylinder ports are likewise divided into two annular series so that each alternate cylinder communicates with one series of ports in the distributer and the remaining cylinders with the other series. Thus by having an odd number of pairs not only do adjacent cylinders but also diametrically opposed cylinders communicate with separate ports of the distributer. These separate sets of ports are spaced apart, that is, they are arranged in spaced circular pathways but such spacing may be axially or radially as will be more particularly pointed out hereinafter. In the distributer the corresponding ports in the two sets are not only offset, either radially or axially in respect to each other, but are also spaced apart 180° about the axis of rotation.

A further object of our invention is to equalize the gas pressure in opposed cylinders during the most important strokes of the cycle. This is accomplished preferably by means whereby the gases contained in opposed cylinders are brought into communication during a given portion of the cycle. This insures simultaneous ignition in both cylinders of a pair by the flame propagation through the pressure equalizing passage even though one spark plug of the pair may fail to operate. This pressure equalizing passage is preferably formed through the distributer with its ends at diametrically opposite points which may be offset axially or radially in respect to each other to correspond with the two series of cylinder ports. Thus they may register with the ports of the two opposed cylinders only once during each complete revolution. This communication is preferably established at or near the end of the compression stroke and may be terminated at or near the explosion, power, or expansion stroke. During each stroke the power is being delivered to the diametrically opposed pistons to exactly the same extent.

A clearer understanding may be had by referring to the accompanying drawings in which various embodiments of our invention are illustrated and in which similar reference characters indicate corresponding parts.

In these drawings:

Figure 1 is a transverse elevation of certain of the essential engine elements, the lower portion and the distributer being in section on a plane through the foremost series of cylinder and distributer ports, as for instance, on the line 1—1 of Fig. 13.

Fig. 2 is a view similar to Fig. 1, the righthand portion being in section through the centers of the cylinders and between the two sets of ports, as for instance, on the line 2—2 of Fig. 13, and the lefthand portion being in section through the rearmost series of cylinder and distributer ports, as for instance, on the line 2ª—2ª of Fig. 13.

Figure 18:
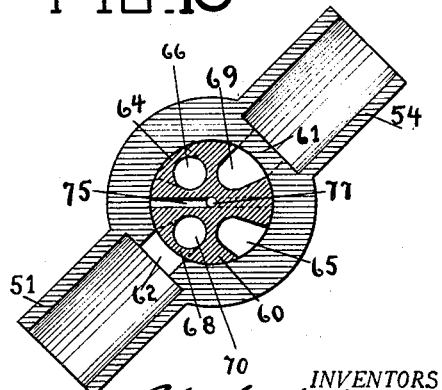

Figs. 3 to 6 inclusive are transverse sections through the distributer and in the planes indicated by the lines 3—3, 4—4, 5—5, and 6—6, respectively, of Fig. 18.

Figs. 7 to 12 inclusive are longitudinal sectional views of a pair of opposed cylinders and the distributer; Fig. 7 showing the ports in registry for intake, Fig. 8 showing the parts after a revolution through 180°, Fig. 9 showing the ports in registry with the equalizing passage as at dead center or during the ignition, Fig. 10 showing the parts revolved 180° from Fig. 9, Fig. 11 showing the parts in position for exhaust, and Fig. 12 showing the parts after rotation through 180°.

Figs. 13 to 18 are transverse sectional views of a pair of opposed cylinders, the relative rotary positions of the cylinders and distributer corresponding to the similarity of Figs. 7 to 12 inclusive on Sheet 2.

Figs. 19 to 24 inclusive are sections similar to Figs. 7 to 12 inclusive but showing a distributer with one set of ports offset radially in respect to each other instead of axially as in Figs. 7 to 12 inclusive.

Figure 19:
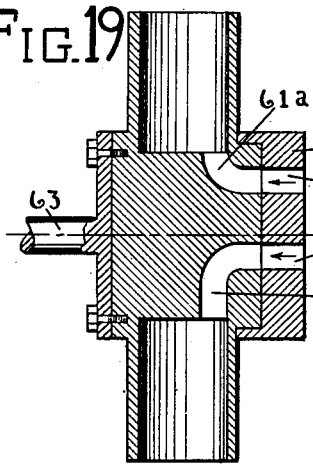
Figure 20:
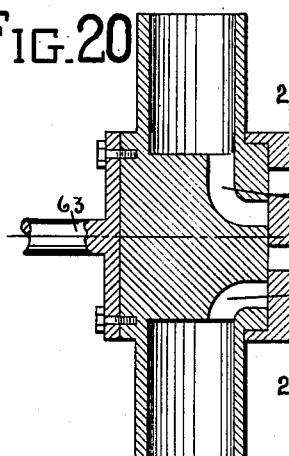
Figure 25:
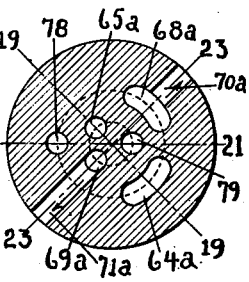
Figure 21:
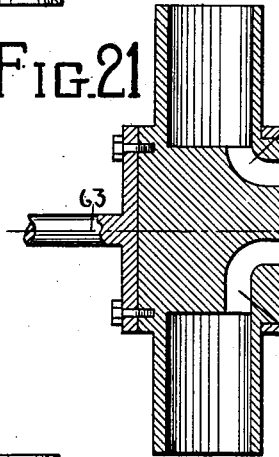

Fig. 25 is a section on the line 25—25 of Fig. 20, and having lines 19—19, 21—21, and 23—23 thereon, indicating the planes on which Figs. 19, 20, and 21 respectively are taken.

Figure 24:
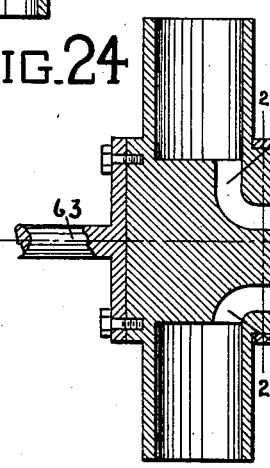
Figure 26:
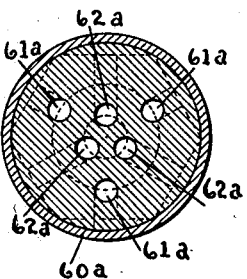

Fig. 26 is a section on the line 26—26 of Fig. 24.

Figs. 27 and 28 are sections similar to 19, 20, respectively, but showing a sleeve form of distributer.

Figs. 29 to 34 inclusive, are sections or the lines 29—34 of Fig. 27, the successive views showing relative ports in successive positions during a complete cycle.

Figs. 35 and 36 are sections on the lines 35—35 and 36—36 respectively of Fig. 27, and Fig. 37 is a section on the line 37—37 of Fig. 28.

In our improved engine, we employ a plurality of radially disposed cylinders, arranged in an odd number of pairs and rotatable about a common axis. The number of cylinders may be two, six, ten, or possibly fourteen. Merely for purposes of illustration, we have shown in Figs. 1 and 2 an arrangement including six cylinders. These may be of any desired construction, cast integrally or secured together, or to any suitable form of frame member to make up a rotor. These six cylinders 50, 51, 52, 53, 54, and 55 are open at their outer ends and each has therein a piston, 56. Encircling the axis of rotation is a guide or track member for facilitating the reciprocation of the pistons. This is illustrated as a member presenting an elliptical track 57 and each piston is shown as having a roller 58 engaging with the track. The rotation of the cylinders with the rollers in engagement with the track effects a complete stroke of each piston for each quarter revolution. In other words, each piston makes four complete reciprocations or strokes during each complete rotation. For a four stroke cycle engine, it will be evident that the four successive strokes of each revolution may perform the four strokes of a cycle so that a complete cycle of operation takes place in each cylinder once during each complete revolution. So far as concerns the arrangement and details of construction thus far described, a wide variety of changes may be made as such details and arrangements constitute no portion of our present invention. The motive fluid is delivered to and withdrawn from the cylinders at their inner ends, the ports being controlled by the rotation of the cylinders in respect to a stationary distributer member 60. As one important feature of our invention, the ports and passages of the distributer and cylinders are so arranged that the same step in the cycle takes place simultaneously in diametrically opposite cylinders. One way of accomplishing this result is illustrated in Figs. 1 to 18 inclusive. Each cylinder has a single port at its inner end which comes into registry with a supply passage and with an exhaust passage of the distributer during the rotation of the cylinder. The cylinder ports are divided into two sets, which are offset in respect to each other. By the term "offset" we mean spaced either axially or radially. In the form shown in Figs. 1 to 18 inclusive, these ports are offset axially, when the ports 61 of each alternate cylinder are disposed at one side of the center of the cylinder in the direction of rotation of the cylinders and the port 62 of the other cylinders are at the other side of their respective cylinder centers measured along the axis of rotation. As there are an odd number of pairs of cylinders, these ports 61 and 62 are in staggered relationship, all of the ports 61 being in one annular series and the ports 62 in a separate annular series, and no two adjacent cylinders have their ports in the same series, and neither do diametrical cylinders have their ports in the same series. This offsetting of the ports 61 and 62 is clearly shown in Figs. 7 to 12 inclusive.

The distributer shown in Figs. 1 to 18 inclusive is of cylindrical form and fits into a cylindrical recess in the rotor in alinement with the main engine shaft 63 which is bolted or otherwise rigidly secured to the rotor. The distributer has two diametrically opposed inlet ports 64 and 65, which are offset axially in respect to each other. The port 64 is so positioned that during the rotation of the rotor it will register in succession with the ports 61 while the port 65 is so positioned that during the rotation, it will register with the ports 62 in succession. In other words, the port 64 supplies one half of the cylinders, namely, each alternate cylinder, and the port 65 supplies the remaining cylinders. These two distributer inlet ports 64, 65 are shown as at the ends of separate supply passages 66 and 67 but this is not at all important as both of the ports 64 and 65 might be supplied from the same passage.

The distributer also has two exhaust ports 68 and 69 which are diametrically opposite to each other and offset axially. The port 68 is so positioned that it will come into registry with the successive ports 61 while the the port 69 is so disposed that it comes into registry with the successive ports 62. Thus the port 68 receives the exhaust gas from one half the cylinders, namely, each alternate cylinder, and the port 69 receives the exhaust gas from the remaining cylinders. These two exhaust ports 68 and 69 are shown as being at the inner ends of the separate exhaust passages 70 and 71, but it is of course evident that a single exhaust passage may lead from both of the ports 68 and 69.

The inlet port 64 and the exhaust port 68 are so spaced circumferentially of the distributer, that as the port 61 passes out of communication with the exhaust port 68, it will almost instantly thereafter come into communication with the inlet port 64, and the distributer is so positioned that the port 61 will leave the port 68 and reach the port 64 while the piston is at or adjacent the inner end of its stroke. In other words, while it is passing dead center on a minor axis of the ellipse. The same applies to the ports 65 and 69 in their relationship to each other and to the opposite dead center on the minor axis of the ellipse.

Figure 13:
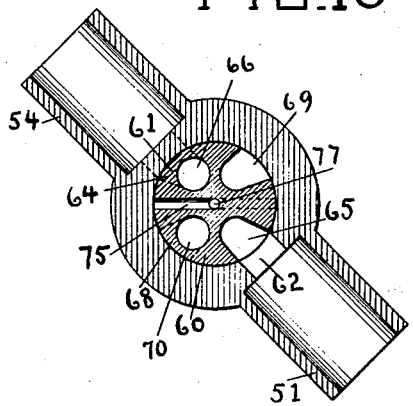
Figure 14:
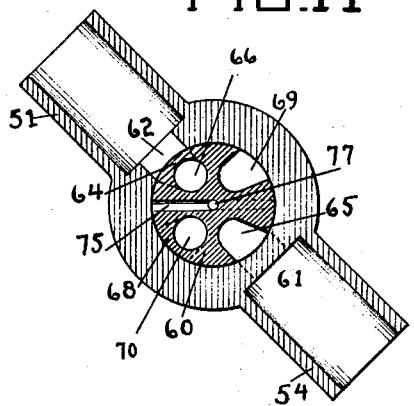

So far as this arrangement for supply and exhaust is concerned, it is thought that the cycle of operation will be clear from Figs. 7 to 18. With the ports in the position shown in Figs. 10 and 16, the pistons of the two cylinders 51, 54 are on the minor axis and at the inner ends of their strokes. The cylinders are seen to be rotating clockwise and the port 62 has just left communication with the exhaust port 69 and is about to come into communication with the supply port 65. During the revolution of the cylinders, they come next to the position shown in Figs. 7 and 13 which is intermediate of the ends of the suction stroke, and the port 62 is in full open communication with the port 65. In the meantime, the port 61 shown in dotted lines has come into registry with the inlet port 64 also shown in dotted lines. The clockwise rotations of the pistons continue and the pistons pass the dead centers on the major axis and the compression stroke begins. The parts are then passing through the position shown in Figs. 12 and 18. Here it will be noticed that the port 61 is opposite to the exhaust port 69 and the port 62 is opposite to the exhaust port 68, but due to the fact that these are offset axially in respect to each other, the escape of gas is prevented. The further rotation continues with continued compression until the parts reach the position shown in Figs. 9 and 15, at which time the pistons are passing the minor axis dead center, and the compression is complete and firing takes place. During this stroke, the intermediate position of which is shown in Figs. 8 and 14, the port 62 does not register with the port 64 and neither does the port 61 register with the port 65, due to the offset relationship of these ports. From the position shown in Figs. 8 and 14, the power or explosion stroke is completed until at or near the major axis dead center, at which time the port 62 comes into registry with the exhaust port 69 and the port 61 comes into registry with the exhaust port 68. During this stroke, the ports pass through the position shown in Figs. 11 and 17. From the foregoing, it will be noted that the same operation takes place in the cylinder 51 that is at the same instant taking place in the cylinder 54. In other words, at diametrically opposite points, the pressures are always the same and therefore the strain on the track and the pressure on the distributer is always counter-balanced. It will, of course, be evident that what is taking place in one opposed pair, as for instance, the pairs of cylinders 51 and 54, will also take place in proper sequence with the other pairs. The expansion or power stroke will take place in the cylinders 51, 53, and 55 each time said cylinders pass through the upper left-hand quarter of the elliptical track, as shown in Figs. 1 and 2, while the expansion or power stroke will take place in the cylinders 50, 52, and 54 during the lower right-hand quarter of the elliptical track.

Figure 15:
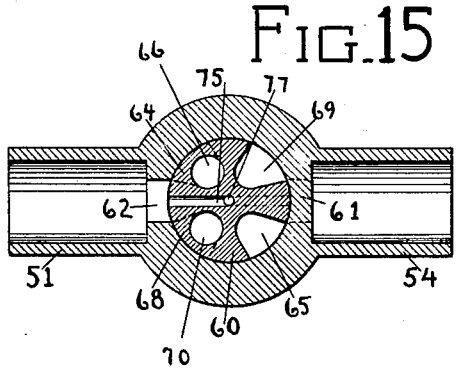
Figure 16:
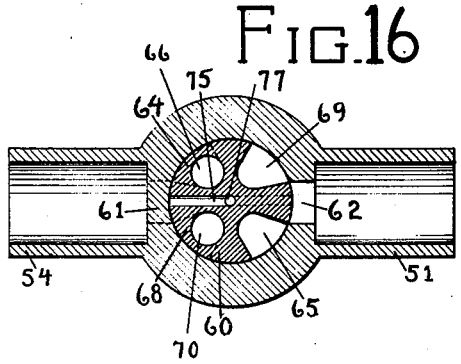
Figure 17:
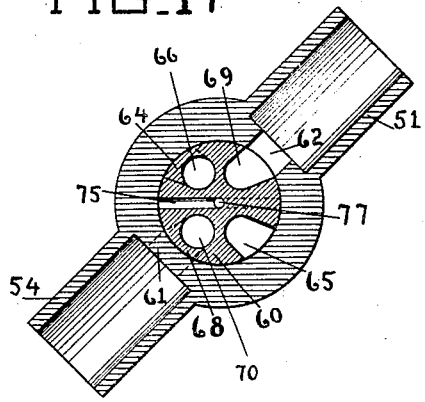

As a further feature of our invention, we provide for the equalizing of the pressures in diametrically opposite cylinders prior to and for a limited time after the firing. To accomplish this, there is provided a communication passage 75 through the distributer and with its ends at diametrically opposite points but offset in respect to each other. One end of the passage 75 is disposed between the ports 64 and 68 but offset axially into the row which includes the ports 65 and 69. This is shown particularly in Figs. 13 and 14. The opposite end of the passage 75 is disposed between the ports 65 and 69 but is offset axially so as to lie in the annular path of the ports 64 and 68 as shown in dotted lines in Fig. 14. This passage will thus communicate at one end with each of the ports 61 in succession, and at the opposite end, will communicate with each of the ports 62. The positioning of the ports is such that it comes into registry just prior to the time when the cylinders reach the dead center position on the minor axis at the end of the compression stroke, as shown in Figs. 9 and 15. It will be noted that at this time the passage opens direct communication between the two opposed cylinders 51, 54 and it is at or near this dead center position that the circuit is closed through the spark plugs 76 for the ignition of the charges in the two cylinders. In case either spark plug fails to operate the flame propagation through the passage 75 will insure the proper ignition of the charge in both cylinders and the equal and opposite power strokes. This passage 75 stays open until the cylinders have completed a portion of their power stroke and then closes between the time the cylinders move from the position shown in Fig. 15 to the position shown in Fig. 14.

The several ports 62, 64, 68, and 69 are shown in such positions and of such sizes that the exhaust will open on the major axis and close on the minor axis and the intake will open on the minor axis and close on the major axis but it will, of course, be evident that for the proper operation of the engine, the ports will in practice be varied slightly in position so as to open the exhaust before the full completion of the power stroke and hold the intake open until delivered past the major axis. Such details do not affect the principle of our invention and of course we do not desire to be restricted to the details there shown.

In connection with the passage 75 we preferably provide a branch or extension passage 77 leading to the outer end of the distributer. In normal operation, this passage may be closed and serve no particular function, but it may be used to material advantage in starting the engine as compressed air may be delivered through the passage 77 and thus through the passage 75 into the cylinders until the starting.

In the construction just described, the ports 61 and 62 are offset in respect to each other in the direction of the axis of the engine and the distributer extends into a recess in the rotor. Neither of these features are essential to the carrying out of our invention as the relative offsetting of the ports may be radially of the rotor and the distributer may engage with the face of the rotor rather than projecting into a recess. Such a construction is illustrated in Figs. 19 to 26 inclusive. The cylinder ports are divided into two sets as in the construction previously described, the ports $61^a$ of one set extending from each alternate cylinder to the end face of the rotor at a distance from the axis of the latter greater than the width of the port. The ports $62^a$ extend from the remaining cylinders to the same end face of the rotor but terminate closely adjacent to the axis of rotation. The distributer $60^a$ engages with this end face and has two inlet or supply passages $64^a$, $65^a$ at different distances from the axis of rotation of the rotor. The passage $64^a$ registers with each of the ports $61^a$ once during each revolution but does not register with the ports $62^a$, while the passage $65^a$ registers with each port $62^a$ once during each revolution but does not register with the ports $61^a$. The distributer is likewise provided with two exhaust passages or ports $68^a$ and $69^a$, terminating at different distances from the axis of rotation and adapted to register with the ports $61^a$ and $62^a$ respectively.

Figure 22:
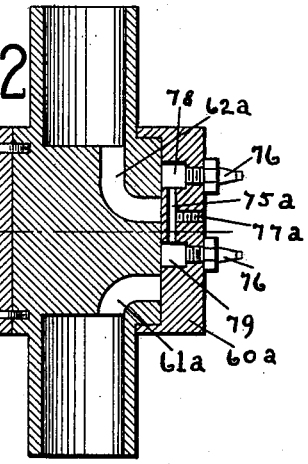
Figure 23:
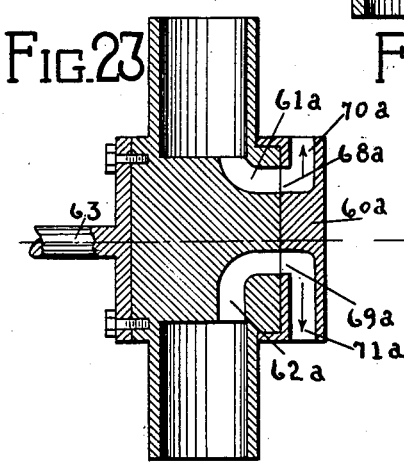

Instead of providing each cylinder with a spark plug, the distributer may carry a pair of spark plugs, one for each of the cylinders of its corresponding set. As shown, there are provided two spark plugs 76 terminating in recesses 78, 79 in the inner face of the distributer. These recesses are at different distances from the axis of rotation whereby the recess 78 comes into registry with the several ports $61^a$ and the recess 79 comes into registry with the several ports $62^a$. The recesses are so positioned on the distributer that the desired communication with an opposed pair of cylinders is established just prior to the time at which it is desired to ignite the charge. As illustrated in Figs. 21 and 22, the cylinders of each opposed pair are in communication at the time of firing by a communication passage $75^a$ corresponding to the passage 75 shown in Figs. 9 and 10 which connects the two recesses 78 and 79. The several Figs. 19 to 24 inclusive, show the parts in positions corresponding to those shown in Figs. 13 to 18 inclusive. Fig. 22 shows the parts prior to the beginning of the suction stroke, Fig. 19 in the middle of the suction stroke, Fig. 24 in the middle of the compression stroke, Fig. 21 at the instant of firing, Fig. 20 in the middle of the expansion or power stroke, and Fig. 23 in the middle of the exhaust stroke.

It will of course be evident that in a construction in which the ports for certain cylinders are at a greater distance from the axis of rotation than corresponding ports for other cylinders, there will of necessity be a corresponding change in the shape of the ports in order to provide the same port area in the same angular distance. We have not attempted to illustrate this difference nor are the ports and passages illustrated necessarily accurately proportioned in respect to the cylinders.

A further form in which the cylinder ports are divided into two groups, one offset axially in respect to the other, is shown in Figs. 27 to 37 inclusive. In this construction the rotor instead of having a recess as shown in Figs. 7 to 12 inclusive or a flat face as shown in Figs. 19 to 24 inclusive, has a cylindrical projection or extension, disposed within a sleeve or tubular type of distributer. This may serve as a journal to aid in supporting the rotor, although the distributers previously described may also aid in serving that purpose. In the construction shown in Figs. 27 to 37 inclusive, the cylindrical extension or projection 80 on the rotor has two sets of passages $61^b$ and $62^b$, one communicating with each alternate cylinder, the others communicating with the remaining cylinders. The two sets of passages extend lengthwise through the projection 80 and terminate in the periphery of the latter in axially displaced or offset groups. As shown, the passages $61^b$ terminate at a greater distance from the cylinders than do the passages $62^b$. Encircling the extension or projection is a distributer $60^b$ in the form of a sleeve or tube having a pair of inlet passages $64^b$, $65^b$ at diametrically opposite points and offset axially of the sleeve in respect to each other, so that one may communicate with each of the passages $61^b$ and the other communicate with each of the passages $62^b$. The sleeve also has a pair of exhaust ports or passages $68^b$, $69^b$ which are diametrically opposite to each other and offset axially. The exhaust port $69^b$ is in the same circular path as the inlet port $65^b$ so as to communicate with the same cylinders as the latter and the exhaust port $68^b$ is in the same circular path as the port $64^b$ so as to communicate with the same cylinders as the latter. Here again we may provide a single pair of spark plugs 76, one for each cylinder of a corresponding group. The two spark plugs extend radially through the wall of the distributer, one being disposed in the same circular path with the inlet $64^b$ and outlet $68^b$ as shown in Fig. 29, and so positioned as to register with the several ports $61^b$, and the other is arranged in the same circular path with the ports $65^b$ and $69^b$ as shown in Fig. 35. The spark plugs are so positioned circumferentially of the distributer that they will come into registry with their corresponding ports at or just prior to the desired time of firing. Figs. 29 to 34 inclusive show the parts in the same corresponding positions as in Figs. 13 to 18, and 19 to 24 inclusive. It is not thought necessary to further describe the operation of this form. In order to make the distributer comparatively short, the passages $64^b$, $65^b$, $68^b$, and $69^b$ are illustrated as being of considerably greater width circumferentially of the distributer than axially thereof as shown particularly in Fig. 37.

This also insures the giving of proper time for port registration. We have shown the passages $61^b$ entering the near side of the corresponding cylinders and the passages $62^b$ entering the far side, but this is immaterial so far as the principle of operation is concerned. It does provide equal length for all passages which better insures equal operations in all cylinders.

Having thus described our invention, what we claim as new and desire to secure by Letters Patent, is:

1. An engine having an odd number of pairs of radially arranged cylinders, rotatable about a common axis, the two cylinders of each pair being diametrically opposed in respect to said axis, pistons in said cylinders, means for reciprocating each piston through four strokes during each complete rotation, and means having motive fluid passages connecting with the two cylinders of each pair simultaneously to effect the same step in the cycle in the cylinders of the same pair at the same time during the rotation.

2. An engine having an odd number of pairs of radially arranged cylinders, rotatable about a common axis, the two cylinders of each pair being diametrically opposed in respect to said axis, and motive fluid distributing means having a pair of ports, one registering with each alternate cylinder once during each complete rotation, and the other registering with the remaining cylinders once during each complete revolution.

3. An engine having an odd number of pairs of radially arranged cylinders, rotatable about a common axis, the two cylinders of each pair being diametrically opposed in respect to said axis, and motive fluid distributing means including a pair of diametrically opposed offset supply ports, and a pair of diametrically opposed offset exhaust ports, one of said supply ports and one of said exhaust ports being arranged to communicate with each alternate cylinder and the other supply port and exhaust port being arranged to communicate with the remaining cylinders.

4. An engine having a plurality of cylinders, rotatable about a common axis, and motive fluid distributing means including a pair of diametrically opposed offset supply ports, and a pair of diametrically opposed offset exhaust ports, one of said supply ports and one of said exhaust ports being arranged to communicate with each alternate cylinder and the other supply port and exhaust port being arranged to communicate with the remaining cylinders.

5. An engine having an odd number of pairs of radially arranged diametrically opposed cylinders, rotatable about a common axis, each of said cylinders having a single port, the ports of each alternate cylinder being arranged in one annular series and the ports of the remaining series being arranged in a separate offset annular series, and a motive fluid distributer having separate inlet and exhaust ports for each of said sets of cylinder ports.

6. An engine having an odd number of pairs of radially arranged diametrically opposed cylinders, rotatable about a common axis, each of said cylinders having a single port, the ports of each alternate cylinder being arranged in one annular series and the ports of the remaining cylinders being arranged in a separate offset annular series, and a motive fluid distributer having a pair of diametrically opposed inlet ports, and a pair of diametrically opposed exhaust ports, one inlet port and one exhaust port being arranged to communicate with the ports of one series of cylinder ports and the other inlet port and exhaust port being arranged to communicate with the other series of cylinder ports.

7. An engine having a plurality of radially arranged cylinders, rotatable about a common axis, each of said cylinders having a single port, the ports for certain of said cylinders being arranged in one annular set and the ports for the remaining cylinders being arranged in a separate annular set, and a motive fluid distributer having a pair of exhaust ports and a pair of inlet ports, one port of each pair arranged to communicate with one set of cylinder ports and the other port of each pair being arranged to communicate with the other set of cylinder ports.

8. An engine having a plurality of pairs of radially arranged diametrically opposed cylinders, rotatable about a common axis, pistons in said cylinders, means for reciprocating each piston through four strokes during each complete rotation, motive fluid distributing means for said cylinders and intermittently connecting with diametrically opposed cylinders during the rotation of the latter to effect the same step in the cycle simultaneously in the two cylinders of a pair, and means for establishing communication between diametrically opposed cylinders during a portion only of each cycle.

9. An engine having a plurality of pairs of radially arranged diametrically opposed cylinders, rotatable about a common axis, pistons in said cylinders, means for reciprocating each piston through four strokes during each complete rotation, motive fluid distributing means having ports adapted to connect with diametrically opposed cylinders during the rotation of the latter to effect the same step in the cycle simultaneously in the two cylinders of each pair, and means for establishing communication between diametrically opposed cylinders at the time of firing.

10. An engine having a plurality of pairs of radially arranged diametrically opposed cylinders, rotatable about a common axis, pistons in said cylinders, means for reciprocating each piston through four strokes during each complete rotation, motive fluid distributing means connecting two diametrically opposed cylinders during the rotation of the latter to effect the same step in the cycle simultaneously in the said opposed cylinders and having a passage establishing communication between the two cylinders of each pair at about the time of firing in said pair.

11. An engine having a plurality of pairs of radially arranged diametrically opposed cylinders, rotatable about a common axis, pistons in said cylinders, means for reciprocating each piston through four strokes during each complete rotation, motive fluid distributing means adapted to connect two diametrically opposed cylinders during the rotation of the latter to effect the same step in the cycle simultaneously in the two cylinders of each pair, said motive fluid distributing means having a passage establishing communication between the two cylinders of each pair successively at or about the time of firing in said pair, said passage being adapted for the delivery of motive fluid under pressure to the engine to start the latter.

Signed at New York in the county of New York and State of New York this 9 day of June A. D. 1919.

CHAS. L. RAGOT.
LOUIS F. RAGOT.